(12) United States Patent
Rieffel et al.

(10) Patent No.: US 7,286,141 B2
(45) Date of Patent: Oct. 23, 2007

(54) SYSTEMS AND METHODS FOR GENERATING AND CONTROLLING TEMPORARY DIGITAL INK

(75) Inventors: Eleanor G. Rieffel, Mountain View, CA (US); Lori O. Toomey, Cupertino, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 912 days.

(21) Appl. No.: 09/942,666

(22) Filed: Aug. 31, 2001

(65) Prior Publication Data

US 2003/0043189 A1 Mar. 6, 2003

(51) Int. Cl.
*G06T 11/80* (2006.01)
*G09G 5/377* (2006.01)

(52) U.S. Cl. ...................... 345/629; 715/753
(58) Field of Classification Search ............... 345/629, 345/634, 636; 715/753, 863
See application file for complete search history.

(56) References Cited

U.S. PATENT DOCUMENTS

| 5,309,555 | A | | 5/1994 | Akins et al. |
| 5,608,872 | A | | 3/1997 | Schwartz et al. |
| 5,781,727 | A | | 7/1998 | Carleton et al. |
| 5,790,818 | A | | 8/1998 | Martin |
| 5,889,523 | A | | 3/1999 | Wilcox et al. |
| 6,329,991 | B1 | * | 12/2001 | Fukuda et al. ............... 345/629 |

OTHER PUBLICATIONS

Dongqiu Qian and M. D. Gross, Collaborative Design with NetDraw, Jun. 7-8, 1999, Proceedings of Computer Aided Architectural Design (CAAD) Futures '99, pp. 1-13, http://depts.washington.edu/dmgftp/publications/pdfs/caadfutures99-netdraw.pdf.*

Carl Gutwin, Traces: Visualization of Interaction, 1999, □58 http://hci.usask.ca/publications/1999/traces-tr/traces-tr.pdf.*
Roman, G.-C.; Cox, K.C.; Program Visualization: The Art Of Mapping Programs To Pictures International Conference Software Engineering, May 11-15, 1992 pp. 412-420.*
Stephen Hayne et al., "Gesturing Through Cursors: Implementing Multiple Pointers in Group Support Systems", Computer Science Technical Reports, Sep. 1, 1992.
Saul Greenberg, et al., "Human and Technical Factors of Distributed Group Drawing Tools," Interacting with Computers, vol. 4, No. 3 (1992), pp. 364-392.
Bly, "A Use of Drawing Surfaces in Different Collaborative Settings", Proceedings of the Conference on Computer-Supported Cooperative Work, ACM, 1988, pp. 250-256.
Brinck et al., "A Collaborative Medium for the Support of Conversational Props", CSCW Proceedings 92, ACM, 1992, pp. 171-178.
Cohen, "The Communicative Functions of Hand Illustrators", Journal of Communication, 27(4), 1977, pp. 54-63.
Genau et al., "Translucent History", CHI Companion 95, ACM, Denver, CO, 1995, pp. 250-251.

(Continued)

*Primary Examiner*—Jeffery A Brier
(74) *Attorney, Agent, or Firm*—Sughrue Mion, PLLC.; Pavel I. Pogodin, Esq.

(57) ABSTRACT

Techniques for generating temporary digital ink on media are provided. Marks or gestures are made using one or more temporary digital inks on media, such as an digital document. Digital ink may be dynamically determined to be permanent or temporary. Each mark or gesture using temporary digital inks may fade based on at least one condition. The conditions include a predetermined time determined based on, a first stroke of the temporary digital ink, completion of the temporary digital ink, appearance of the temporary digital ink to another user, a first stroke of a succeeding group of digital ink, and a stroke of the succeeding digital ink is completed. Conditions may also include changing display attributes, such as color and thickness of digital ink, and fading or switching in reaction to an audio or video signal.

68 Claims, 5 Drawing Sheets

OTHER PUBLICATIONS

Chiu et al., "A Dynamic Grouping Technique for Ink and Audio Notes", UIST '98, ACM Press, 1998, pp. 195-202.

Greenberg et al., "GroupSketch: A multi-user sketchpad for geographically-distributed small groups", Proceedings of the Graphics Interface 91, Jun. 5-7, Calgary, pp. 207-215.

Greenberg et al., Groupware for Real-Time Drawing, McGraw-Hill 1995.

Flexible JAMM (Java Applets Made Multiuser) Home Page http://pse.cs.vt.edu/JAMM/main.html, printed Aug. 22, 2001.

Mitchell et al., "Learning to Write Together Using Groupware", Proceedings of CHI '95, Apr. 1995, pp. 288-295.

Stefik et al., "Beyond the Chalkboard: Computer Support for Collaboration and Problem Solving in Meetings", Communications of the ACM, Jan. 1987, pp. 32-48.

Mitchell, "Communication an Shared Understanding in Collaborative Writing" Master's thesis, Department of Computer Science, University of Toronto, Jan. 1996.

* cited by examiner

SYSTEMS AND METHODS FOR GENERATING AND CONTROLLING TEMPORARY DIGITAL INK

BACKGROUND OF THE INVENTION

1. Field of Invention

The present invention relates to methods and systems for providing temporary digital ink on electronic media. In particular, the present invention relates to fading digital ink.

2. Description of Related Art

The growth of the World Wide Web and the proliferation of computer networks have enabled people in dispersed locations to share resources. But mechanisms enabling effective communication about these resources, particularly mechanisms for discussion of visual content, have lagged far behind the mechanisms for access. Visual information is important to communication about a variety of resources, from plain text documents to complex graphics. In particular, support for gestures analogous to hand gestures in face-to-face communication within collaborative applications have remained primitive.

Telepointers are the most commonly provided tool for communicating about visual information within collaborative spaces, such as desktop conferencing systems and shared editing tools. Use of telepointers does not result in an accumulation of clutter within the workspace. However, telepointers provides only limited communication bandwidth.

Many collaborative applications also provide digital ink with which the collaborators can make marks in the shared space or on artifacts, such as shared documents, within the application. Each collaborator can see the marks made by every other collaborator. Drawing with digital ink can be used to communicate effectively, especially about visual content, within a virtual space. The users of the collaborative application can use the ink as an effective means of communication.

For example, Akins (U.S. Pat. No. 5,309,555) teaches a conventional system that enables freehand drawing data drawn on one computer, to be sent to other computers over a network. Schwartz (U.S. Pat. No. 5,608,872) discusses a conventional system which allows multiple participants to watch and issue commands to a shared application program, and to make annotations on the computer screen that are seen by all other participants. Carleton (U.S. Pat. No. 5,781,727) teaches a conventional system that allows users of computers to find markings previously made by the user on a shared document.

Similarly, Martin (U.S. Pat. No. 5,790,818) discusses a conventional method for highlighting areas of a shared screen.

In a co-pending, co-assigned application, Docket No. 110014, entitled "Systems and Methods For Automatic Emphasis Of Freeform Annotations" incorporated herein by reference in its entirety, a method for distinguishing high-value versus low-value annotations based on the type of ink marks made is described.

However, in collaborative applications, these expressive marks and/or gestures can quickly overwhelm the collaborative space with clutter since both marks and/or gestures needed permanently and marks and/or gestures needed temporarily remain in the collaborative space. In addition, erasing marks and/or gestures does not come naturally. As a result, the collaborative space becomes cluttered with marks and/or gestures. These clutter problems increase as ink is used for frequent referent gestures as well as for other marks.

Genau ("Translusent History", CHI Companion 95, ACM, Denver, Co, 1995, pp. 250-251) discusses a conventional system which provides users with the ability to fade the current contents of their workspace. A new translucent workspace through which the faded version of the previous workspace is visible is then provided. In the system suggested by Genau, an architect might view a previous version of an architectural workspace faded dimly below the current modified version of the workspace. Multiple workspaces, each workspace increasingly faded based on increasing age are also suggested.

However, in Genau, the decision to fade marks is made after the drawing has been done. Also in Genau, the fading is of an entire workspace so it is impossible to independently fade overlapping marks on the same workspace. Thus, Genau cannot be used for referent gestures to marks occurring on the same level. Moreover, in Genau, fading is in discrete steps, with each discrete step directed by the user.

In Hayne's conventional system called GroupSketch, an inactive cursor 'dissolves' away to reduce visual clutter. However, Hayne does not teach or use a temporary digital ink and no fading of the temporary digital ink occurs.

SUMMARY OF THE INVENTION

This invention provides systems and methods for generating temporary digital ink that fades with time. This invention also provides temporary digital ink for supporting expressive and complex temporary gestures. This invention also provides fading ink that may be used to support referent gestures, and other gestures that are need for only a short duration. This invention further provides an ink that can also be used to provide annotations, as well as any other application where temporary marks or gestures are required.

The methods and systems for generating temporary digital ink according to this invention provide for generating and controlling temporary or fading digital ink. To do so, the present invention provides a method for generating temporary digital ink on a media, that includes applying a plurality of digital inks on a media and fading each of the plurality of the digital inks based on at least a first condition. The first condition may be a predetermined time based on a first stroke of the digital ink, completion of the digital ink, appearance of the first stroke of the digital ink to users who did not apply the digital ink, the appearance of the completed digital ink to the users who did not apply the digital ink, a first stroke of succeeding digital ink, completion of the succeeding digital ink, intonational phrase, or any other time that may be determined by known or later developed techniques.

This invention also provides a temporary digital ink generating system that generates and controls a plurality of temporary digital inks on a media. The temporary digital ink generating system includes a temporary digital ink generating circuit that applies a plurality of digital inks on a media data on a first user device and a digital ink fading system that fades each of the plurality of the digital inks based on at least one condition.

BRIEF DESCRIPTION OF THE DRAWINGS

The invention is described in detail with regard to the following figures, wherein like numbers reference like elements, and wherein.

DETAILED DESCRIPTION OF EXEMPLARY EMBODIMENTS

Temporary digital inks generated according to this invention can be used to increase the efficiency of communication between users of shared documents. A temporary digital ink according to this invention means a digital ink that fades over time based on user or system selectable bases. In contrast, a non-temporary digital ink refers to a digital ink that remains on a media over time. For example, a temporary digital ink may be generated to indicate a referent gesture between collaborative users. Since the usefulness or the referent gesture may decrease with time, the digital ink of a referent gesture may be faded. This is done by, for example, determining a predetermined time with respect to the stroke of a mark using the temporary digital ink generated by the temporary digital ink circuit 200. The temporary digital ink mark may be any mark including freehand or typed writing and/or drawing, highlighted lines, a telepointer graphical indicator, such as an arrow, boxes and circles, or any other known or later developed mark. The marks may be composed of one or more strokes, and may be considered as one mark if a plurality of strokes are made within a predetermined time or within a predetermined intervals. The temporary digital ink strokes may also be considered as one mark if the temporary digital ink strokes occur within a predetermined proximity.

Figure 1:
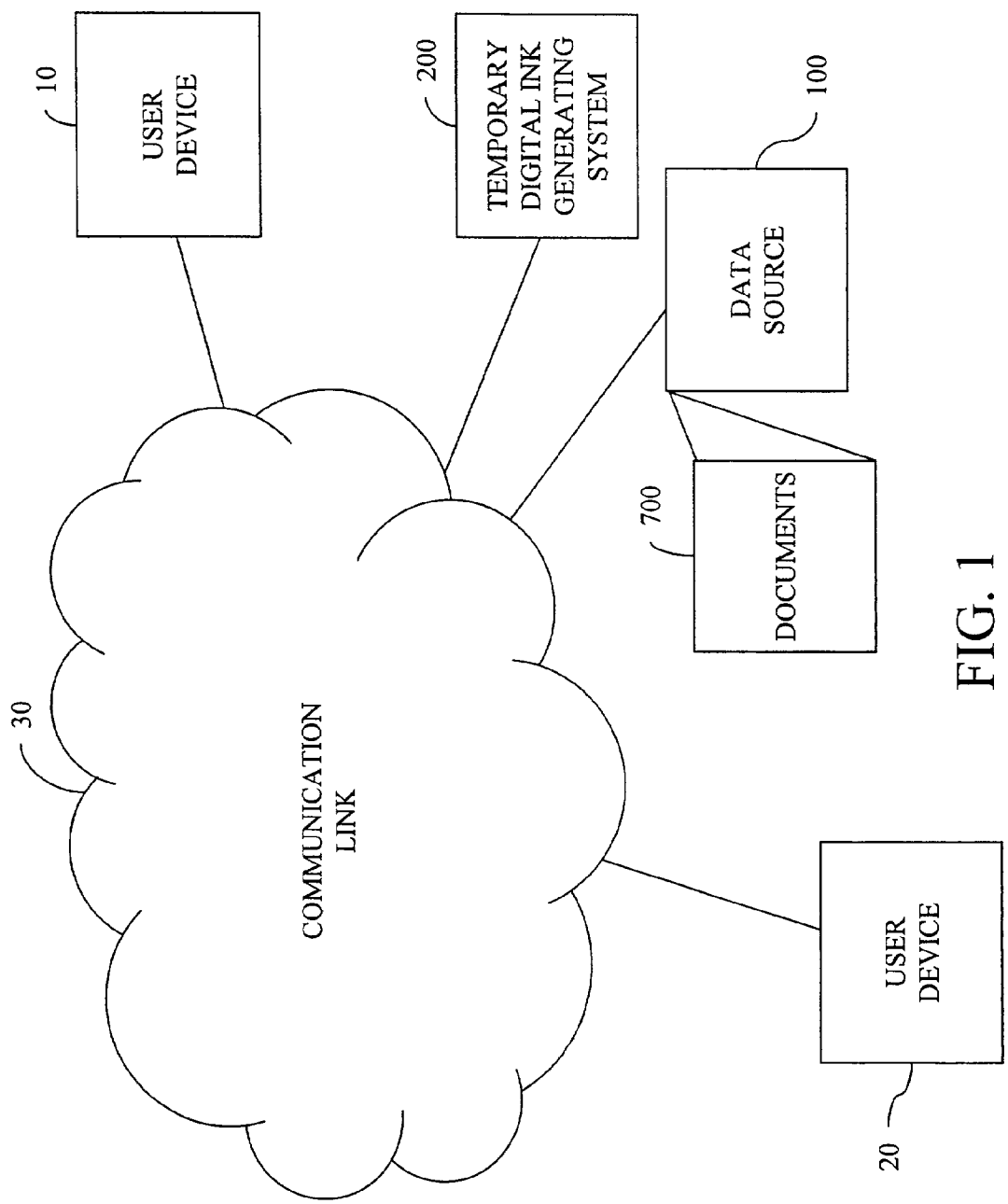
FIG. 1 is a general overview of an exemplary temporary digital ink generating system according to this invention.

FIG. 1 is a general overview of an exemplary temporary digital ink generating system according to this invention. A first user device 10 is connected to a second user device 20 via communication link 30. The first user device 10 may be a single terminal, such as a computer, or any other known or later developed device able to communicate with the second user device 20 over the communication link 30. The first user device 10 and second user device 20 are each connected to a data source 100 containing documents 700 and a temporary digital ink generating system 200 via the communication link 30. Media data, such as a document 700, can be retrieved by the first user device 10 and/or the second user device 20 to be collaboratively shared. During collaboration, a user at the first user device 10 and the user at the second user device 20 can share the document 700 and use temporary digital ink to communicate within the document using the temporary digital ink generating system 200.

Figure 2:
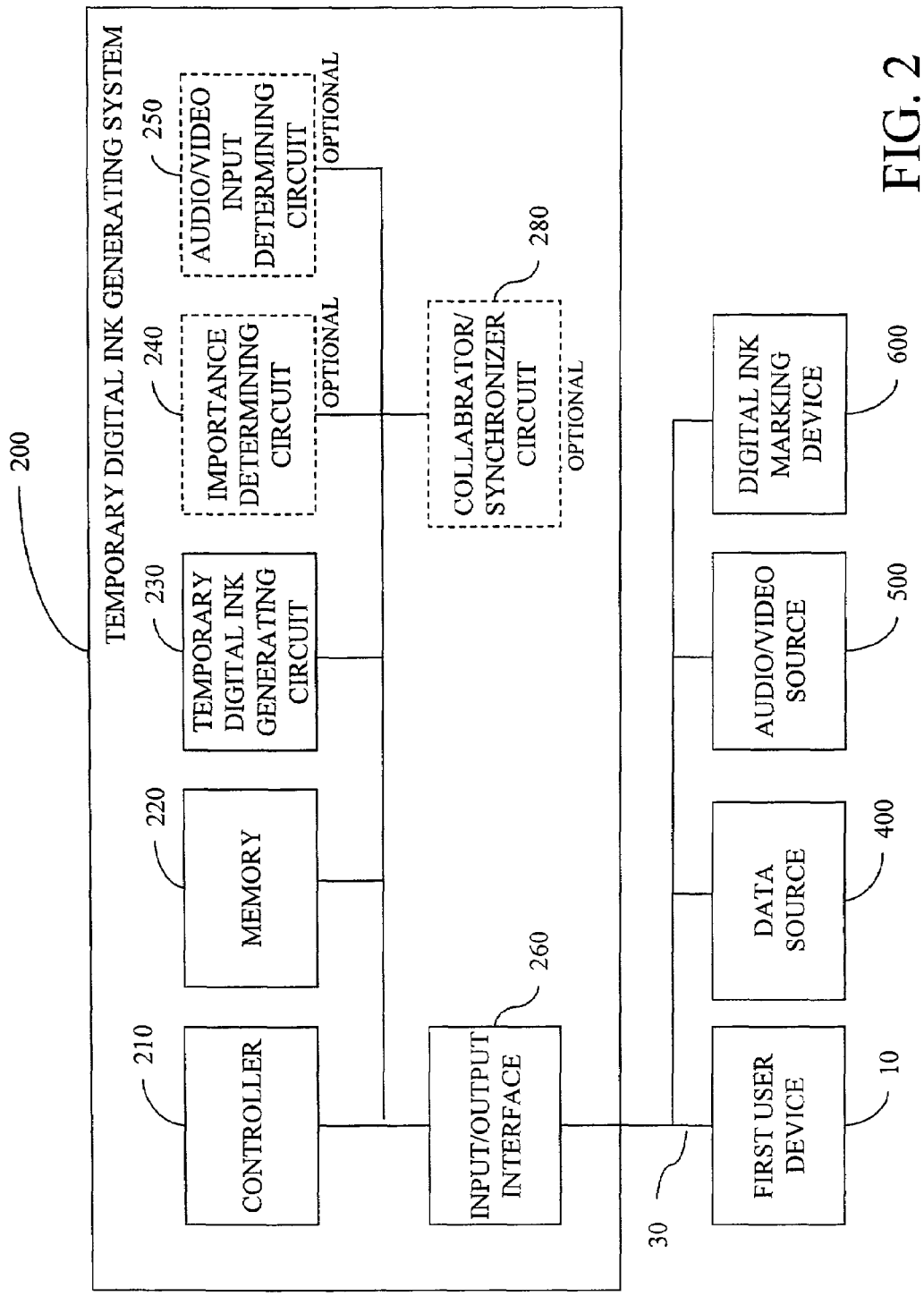
FIG. 2 is a block diagram showing an exemplary embodiment of a temporary digital ink generating system.

FIG. 2 shows a diagram of an exemplary embodiment of a temporary digital ink generating system 200 according to this invention. As shown in FIG. 2, a first user device 10, a data source 400, a digital ink marking device 600 and an audio/video source 500 are connected to the temporary digital ink generating system 200 via the communication link 30. The data source 400 can be a locally or remotely located computer sharing data, a scanner, or any other known or later developed device that is capable of generating electronic media, such as a document. The data source 400 may also be a data carrier, such as a magnetic storage disc, CD-ROM or the like. Similarly, the data source 400 can be any suitable device that stores and/or transmits electronic media data, such as a client or a server of a network, or the Internet, and especially the World Wide Web, and news groups. The data source 400 may also be a live video conferencing device, a television, a video tape player or any known or latter developed device that broadcasts media data.

The communication link 30 can be any known or later developed device or system for connecting the data source 400 to the temporary digital ink generating system 200, including a direct cable connection, a connection over a wide area network or local area network, a connection over an intranet, a connection over the Internet, or a connection over any other distributed processing network system.

It should also be appreciated that the media of the data source 400 may be a scanned image of a physical document or a photograph, video recordings, media data created electronically using any software, such as word processing software, or media data created using any known or later developed programming language and/or computer software program, the contents of an application window on a user's desktop, e.g., the toolbars, windows decorations, and spreadsheet shown in a spreadsheet program, a live broadcasting of a video image, or any other known or later developed data sources.

Moreover, the media may be an analog image and/or object, such as a picture, drawing, and any object with which the digital ink may be used.

The first user device 10 can be any device that is capable of outputting or storing the process media data generated according to the system and methods according to this invention, such as a display device, a printer, a copier or other image forming device, a facsimile device, a memory and the like. In exemplary embodiments, the first user device 10 is shown; however, it will be apparent that any number of user devices can be used in the practice of this invention.

The communication link 30 can be any known or later developed device or system for connecting first user device 10 to the temporary digital ink generating system 200, including a direct cable connection, a connection over a wide area network or local area network, a connection over an intranet, a connection over the Internet, or a connection over any other distributed processing network or system.

The digital ink marking device 600 can be any device that is capable of inputting markings of digital ink on the media data. The digital ink marking devices 600 include mice, keyboards, touch screens, pen tablets or any known or later developed devices that allow a user to mark on the media data.

The audio/video source 500, connected via the communication link 30, can be any device that is capable of providing audio sound and/or video images to the temporary digital ink generating system 200. For example, the audio/video source 500 can be a microphone, an audio replay device, such as a CD player, or any known or later developed device that generates audio sound, a video camera, a digital still camera, or any known or later developed device that generates video images.

The temporary digital ink generating system 200 includes a controller 210, a memory 220, a temporary digital ink generating circuit 230, an optional importance determining circuit 240, an optional audio/video input determining circuit 250, an input/output interface 260, and an optional collaborator/synchronizer circuit 280, all of which are connected via the input/output interface 260 to a communication link 30.

The controller 210 controls the operation of other components of the temporary digital ink generating system 200. The controller 210 performs any necessary calculations and executes any necessary programs for generating temporary digital ink, and controls the flow of data between other components of the temporary digital ink generating system 200 as needed.

The memory 220 may serve as a buffer for information coming into or going out of the temporary digital ink generating system 200, may store any necessary programs and/or data for implementing the functions of the temporary digital ink generating system 200, and/or may store data and/or temporary digital ink at various stages of processing.

In FIG. 2, alterable portions of the memory 220 are, in various exemplary embodiments, implemented using static or dynamic RAM. However, the memory 220 can also be implemented using a floppy disk and disk drive, a writable optical disk and disk drive, a hard drive, flash memory or the like. The memory 220 may also be implemented using ROM. However, the static portions can also be implemented using other non-volatile memory, such as PROM, EPROM, EEPROM, an optical ROM disk, such as a CD-ROM or DVD-ROM, and disk drive, flash memory or other alterable memory, as indicated above, or the like.

The importance determining circuit 240 is activated to determine the importance of words or phrases marked with the temporary digital ink using the systems and methods of co-pending application, entitled "Systems and Methods For Automatic Emphasis Of Freeform Annotations", Docket Number 110014, or any other known or later developed methods for determining importance of a mark. The optional audio/video input determining circuit 250 determines whether there is audio and/or video input over the communication link 30.

The input/output interface 260 connects first user device 10 and second user device 20, the data source 400, the audio/video source 500 and the digital ink marking device 600 to the temporary digital ink generating system 200 via the communication link 30.

The optional collaborator/synchronizer circuit 280 can optionally synchronize all user's view of marks or gestures made using the temporary digital inks on each user's device.

Figure 3:
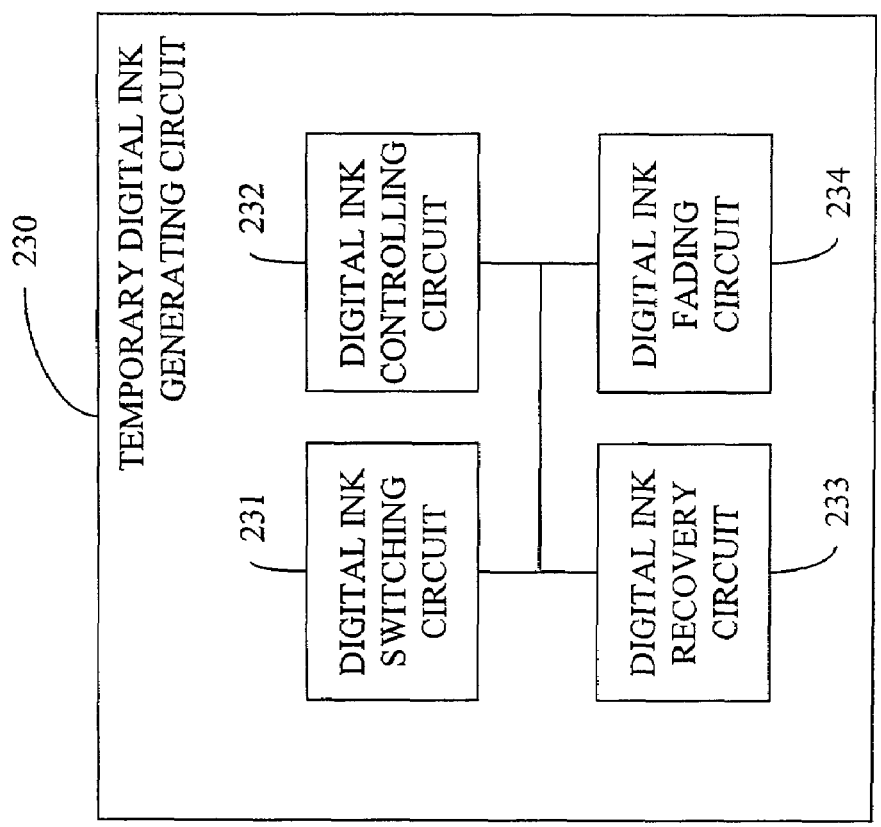
FIG. 3 is a block diagram showing an exemplary embodiment of a temporary digital ink generating circuit according to the exemplary temporary digital ink generating system of FIG. 1.

FIG. 3 shows an expanded view of temporary digital ink generating circuit 230 which includes a digital ink switching circuit 23 1, a digital ink controlling circuit 232, a digital ink fading circuit 234 and a digital ink recovery circuit 233.

The digital ink switching circuit 231 allows the user to select a temporary digital ink or a non-temporary digital ink and to select between a temporary digital ink and a telepointer. In other words, based on a command from a user at the first user device 10 who is sharing a document or media with a user at the second user device 20, the temporary digital ink switching circuit 231 changes from a temporary digital ink to a non-temporary digital ink, or vice versa. The command may be clicking on the temporary digital ink or any known or later developed method of initializing a command. Moreover, the digital ink switching system 231 can restore the digital ink to their original state before any switching took place , on receipt of a restore command.

The digital ink controlling circuit 232 changes the format of the digital ink. For example, the users may set different colors to indicate different topics or to indicate different users collaborating in the same media data. Alternatively, the user may desire to change the thickness of the digital ink such that the digital ink may be used as a pen or a highlighter. The digital ink controlling circuit 232 can also change the format of the digital ink based on the importance of the marked word or phrases determined by the importance determining circuit 240 as described above. For example, in another exemplary embodiment according to this invention, if the marked word or phrase is of high value or importance, the digital ink controlling circuit 232 may change the color of the digital ink to a more attention-grabbing color, such as red. The digital ink controlling circuit 232 may also change the thickness of the stroke of the digital ink such that, for example, thicker lines are used to mark more important words or phrases while less important words or phrases may be marked with thinner lines.

It is appreciated that the digital ink controlling circuit 232 can also configure the digital ink to change its color and/or thickness while fading out. For example, the digital ink that is just marked on the media data may be in red, while the color changes over time. For instance, the digital ink may gradually change from red to blue.

The digital ink controlling circuit 232 can also configure how soon the digital ink may start to fade out. For example, the user may set a predetermined time after which the digital ink starts to fade out. The predetermined time may be a constant time after starting the first stroke of the digital ink or a constant lime after completing the stroke. In addition, the predetennined time may be a constant time after the first stroke appears on first user device 10 or any other output device (e.g. a computer display) with whom the user is sharing the same media data, or a constant time after the complete stroke of a digital ink appears at first user device 10 or any other output device with whom the user is communicating. Furthemiore, the predetennined time may be a constant time after a group of strokes ends on the first user device 10 or appears on the second user device 20 to whom the user is communicating. Furthermore, it will be apparent that the fading may start immediately after a stroke or cluster of strokes are completed, at the end of the accompanying intonational phrase, if audio is available, or the like. It will also be apparent that the digital ink controlling circuit 232 may be used to change any display characteristics of the digital ink such as color, thickness, shave, fade or duration time or any other known or later developed display characteristics of the digital ink. It will be apparent that the fading operation may start automatically after the predetermined time is elapsed.

The predetermined time can also be varied based on the importance of the words or phrases marked by the digital ink. For instance, the words or phrases having higher importance may remain on the media data for longer time than less important words or phrases. In addition, the predetermined time can be varied based on the users. In other words, the digital ink marked by one of the users (e.g. company president) may remain on the media data longer than the ones marked by others (e.g. vice presidents).

It will be apparent that the predetermined time may be set at any length of time. For example, the user may desire the digital ink to start fading in a few second after he or she completes his or her strokes of marking, or the user may desire the digital ink to remain such that the digital ink does not start to fade out until after a few years, for example.

In addition, it is possible for the digital ink controlling circuit 232 to set the temporary digital ink to start fading out when various digital ink covers a predetermined area or percentage of area with respect to the media data as a whole. For instance, the user may desire the digital ink to start fading when the digital ink covers approximately 20% of an area of media data shown on first user device 10. Moreover, it is also possible for the digital ink controlling circuit 232 to set the digital ink to start fading when the number of digital inks on the media data reaches a predetermined number.

The digital ink controlling circuit 232 can also allow the user of first user device 10 to set how fast the digital ink fades out. The digital ink may be faded at a predetermined speed. The predetermined speed is a time taken from the start to the end of the fading operation, and may be, for example, 3 seconds. However, it is appreciated that this predetermined speed can be any number such that the digital ink may fade out milliseconds or over years. Furthermore, the predetermined speed may be zero, at which the digital ink simply fades or disappears instantaneously. This predetermined speed may be changed by the user or may be preset. Moreover, it is apparent that the predetermined speed may be changed dynamically, such that, for example, the digital ink may first fade slowly and then fade faster after a few seconds. In addition, the predetermined speed may be changed based on the importance of the words or phrases, or depending on the users.

Furthermore, the predetermined speed may be changed during the fading by the users. For instance, the predetermined speed may change if the user clicks on the fading marks (e.g. "Slow"). Then, the predetermined speed may change if the user click again on the fading marks (e.g. "Fast"). In addition, the user may be able to change the predetermined speed while the temporary digital ink is fading by, for example, using a graphical user interface, such as a scrollable speed bar.

The digital ink controlling circuit 232 also allows the user of first user device 10 to set whether the digital ink may be completely faded out or a trace of the digital ink may remain. For example, the user may desire that the trace of digital ink remains on the media data in a light color so that the digital ink may not cause any obstruction to any other digital ink viewed at a later time but is still noticeable.

For instance, the user may set the temporary digital ink to fade until it reaches, for example, 10% of the original color depth. To do so, the user may wish to return to the media data and desire to be able to know and identify the fact that there was a digital ink that faded over the time. Moreover, the digital ink may also fade such that a part of the digital ink still remains on the media data. In other words, the digital ink may fade partially or completely to the initial stroke or starting point. Other users are then able to distinguish a temporary marking on the media data that can be restored if requested.

The digital ink controlling circuit 232 may also start fading based on a user input, such as an audio and/or video input. The user may desire to start the digital ink to fade out when his or her presentation is completed. In one exemplary embodiment, an optional audio/video input determining circuit 250 determines the end of audio and/or video input from an audio/video source 500 via the communication link 30. The digital ink controlling circuit 232 fades the digital ink based on the audio and/or video signal. For example, at a predetermined time after the end of the audio signal, the digital ink may fade. The predetermined time may be preset or may be determined by the user.

In addition, it is apparent that the fading may start based on determination of intonational phrases. For example, the audio input may segmented by small increments. Then, using known or later developed techniques, the segment of the audio input is analyzed. For example, when the end of an intonational phrase accompanying an ink stroke is detected, the fading of that stroke may start.

Furthermore, it is apparent that the digital ink may start to fade when the audio/video input determining circuit 250 determines that a video input, such as video source, has been changed. It is apparent that the fading may start when a video input of a user is changed to, for example, that of another user.

The digital ink controlling circuit 232 also allows the user who marked the digital ink and/or any other users who are viewing the media data to commence the fading of the digital ink by, for example, clicking on the digital ink. In addition, the digital ink controlling circuit 232 may commence the fading when any user or users starts new markings using the temporary digital ink.

The digital ink fading circuit 234 controls the fading of the digital ink. The digital ink fading circuit 234 fades the digital ink based on the configuration determined by the digital ink controlling circuit 232.

The digital ink recovery circuit 233 allows the user to recover the fading or faded digital ink. For example, the users may desire to recover a fading digital ink while it is fading or after it has faded. To do so, the user selects the fading or faded digital ink, clicks on the fading ink or uses any other known or later developed method of selecting. At this time, the digital ink may become a non-temporary digital ink or start fading after a predetermined time.

Figure 4:
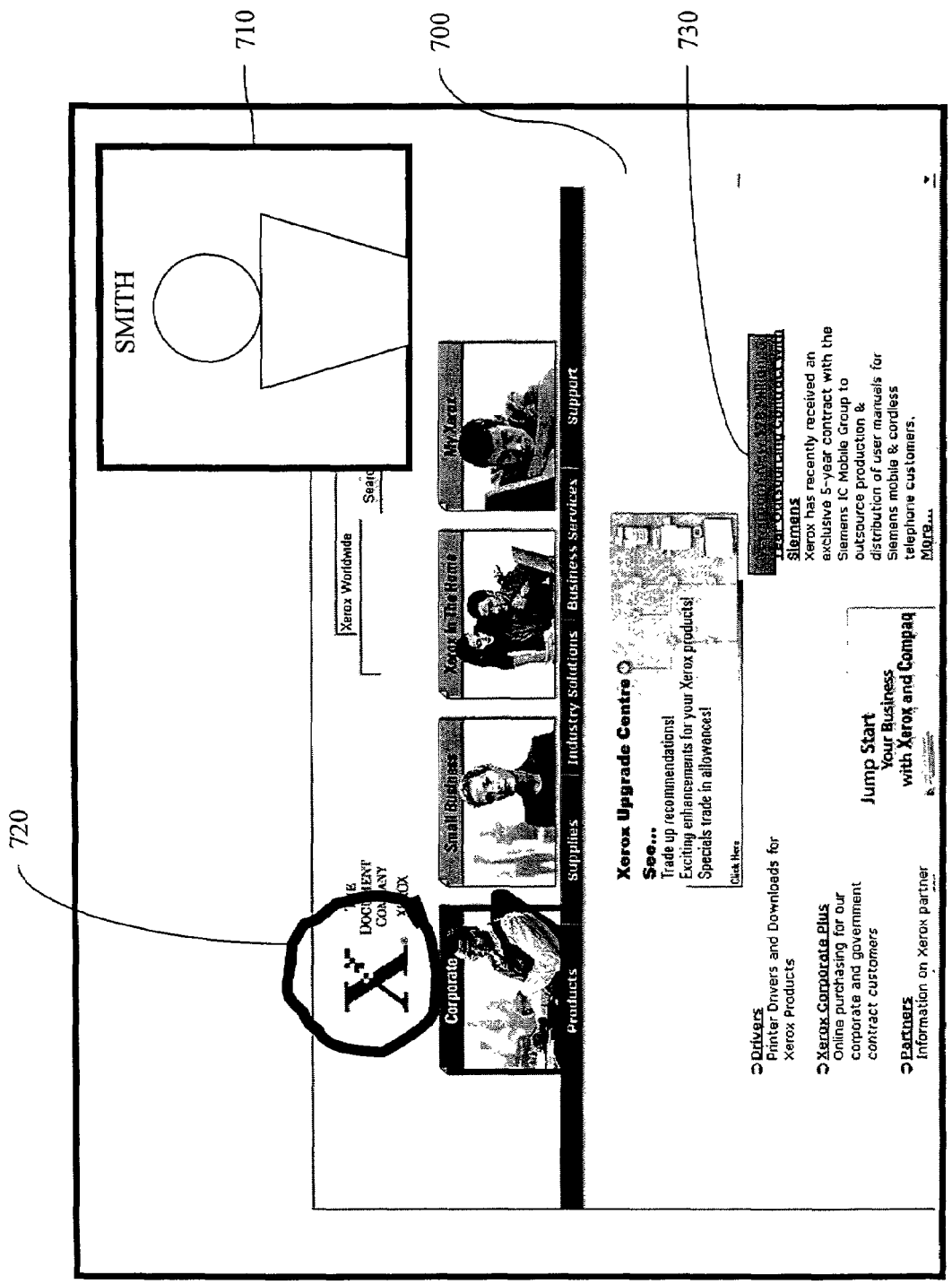
FIG. 4 is an exemplary application of the temporary digital ink to an electronic document.

FIG. 4 shows an exemplary view of a document marked using the temporary digital ink generating system 200. The temporary digital ink generating system 200 generates temporary digital ink as described in detail below.

The temporary digital ink can be used while two or more parties share the same information at the same time during, for example, video conferencing. In this exemplary embodiment, it is assumed that the two users are sharing the same media data over an intranet.

First, a first user device 10 retrieves media data, such as a document 700, from the data source 100. The document is displayed on first user device 10. In various other exemplary embodiments according to invention, the media data may be a live picture 710 transmitted to and/or from the first user device 10 or any other known or later media data. It is apparent that the number of live pictures is not limited to one but depends on the number of users sharing the same media data and the capabilities of first user device 10. The media data is then optionally shared via a communication link 30 with the second user device 20. The first user device 10 and the second user device 20 may communicate to each other with marks and/or gestures while sharing the same document 700. For example, during the communication, the user of first user device 10 marks the document with digital inks, such as highlight 730 and/or a circle 720 to indicate the focus of discussion.

As the first user device 10 and second user device 20 continue to make digital ink markings, a buildup of too many markings may occur on the document 700. The buildup of markings may cause an obstruction to the viewing of the document 700. However, according to a first embodiment according to the invention, if desired, the user of first user device 10 may set the digital ink to fade out over a period of sixty seconds from each mark's creation. For example, sixty seconds after the first stroke was made, the ink may be completely faded.

According to various exemplary embodiments according to this invention, once the digital ink starts to fade the user of first user device 10 and/or user of second user device 20 can recover the digital ink to the original state by selecting it. For example, highlight 730 may be selected by clicking on the remaining unfaded digital ink. However, it will be apparent that any other known or later developed technique of selection may be used.

When the fading process is completed, the faded digital ink may remain on the document as a trace or may be completely faded from the document.

The temporary digital ink generated by the temporary digital ink generating system 200 according to this invention may be stored separately. However, it is apparent that the temporary digital ink may be stored together with the shared document or in any other location accessible over communications link 30.

Figure 5:
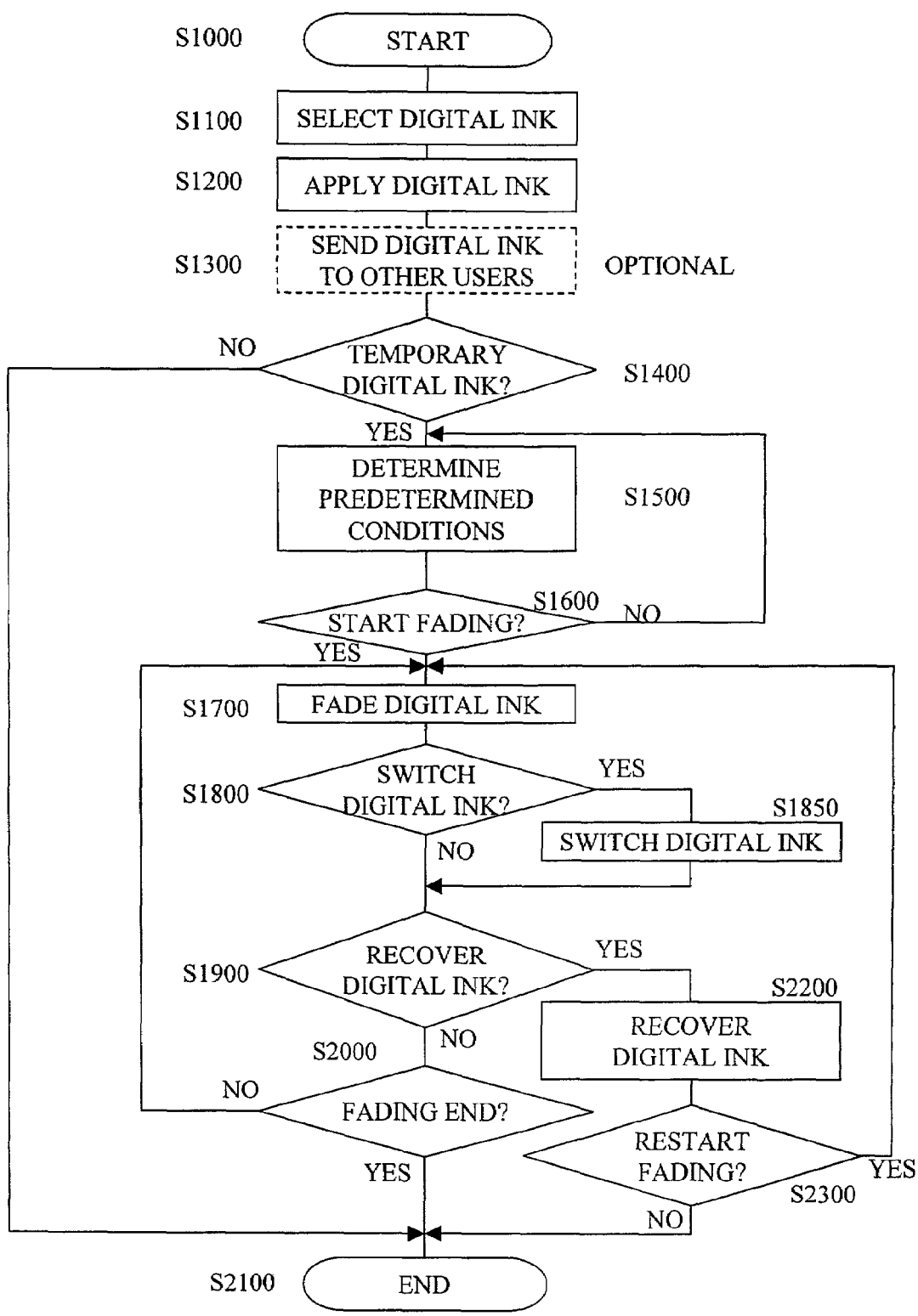
FIG. 5 is a flowchart of an exemplary method for generating a temporary digital ink.

FIG. 5 is a flow chart of an exemplary method for generating temporary digital ink according to this invention.

The process begins at step S1000 and continues to step S1100. In step S100, a type of digital ink, such as temporary or non-temporary, is selected, and the process continues to step S1200.

In step S1200, a digital ink is applied to the media data. For example, a highlight may be applied to a document by the user.

The process then continues to optional step S1300. If this step is not necessary, the process continues to step S1400. In step S1300, the digital ink is transmitted to other users along with the shared document.

In step S1400, it is determined whether the digital ink is temporary digital ink. If it is determined that the user has not selected a temporary digital ink, then control continues to step S2100 and the process ends. Otherwise, control continues to step S1500.

In step S1500, predetermined conditions for fading the temporary digital ink are determined. The predetermined conditions may include a predetermined time after which the temporary digital ink starts to fade, a predetermined speed at which the temporary digital ink fades, and a predetermined percentage at which the fading is completed or a predetermined time determined any other known or later developed methods. Control then continues to step S1600

In step S1600, it is determined whether the temporary digital ink starts to fade based on a predetermined condition. If so, the process continues to step S1700, otherwise control returns to step S1500, and steps S1500 and S1600 are repeated until it is determined that the predetermined conditions are satisfied. The control then continues to step S1700.

In step S1700, the temporary digital ink starts to fade based on the predetermined conditions.

The process then continues to step S1800. In step S1800, it is determined as to whether the digital ink should be switched. For instance, it is determined whether the temporary digital ink may be switched to a non-temporary digital ink. If so, the process continues to step S11850, otherwise the process continues to process S1900.

Instep S1850, the digital ink is switched between a temporary digital ink and a non-temporary digital ink, or vice-versa. Control then continues to step S1900.

In step S1900, it is determined as to whether the digital ink should be recovered. If it is determined that the digital ink is not to be recovered, control continues to step S2000, otherwise control jumps to step S2200.

In step S2000, it is determined as to whether the fading has been completed, by for example, determining whether the predetermined percent of fading has been reached. If so, the process ends at S2100, otherwise the process returns to step S1700.

If it is determined in step S1900 that the digital ink is to be recovered, control continues to step S2200. In step S2200, the digital ink is recovered by, for example, returning the fading or faded digital ink to the state before the fading occurred, e.g. color depth and/or thickness. Control then continues to step S2300.

In step S2300, it is determined as to whether the fading should restart. If it is determined that fading should be re-started, control continues to step S1700, otherwise the control continues to at step S2100 and the process ends.

It is apparent that these steps are described in above order for illustration purpose, and in various exemplary embodiments, the determination to fade previously designated non-temporary digital ink may also occur.

Furthermore, in the various exemplary embodiments outlined above, it is apparent that the fading operation may be selectably applied in a collaborative environment. For instance, digital ink made by a first user may be shared by other users, which digital ink made by a second user may not be shared by the other users. Moreover, it is apparent that in such environment either or both of the digital ink could fade.

In the various exemplary embodiments outlined above, it should be appreciated that the communication link 30 can be wired or wireless link to a network. The network can be a local area network, a wide area network, an intranet, the Internet, or any known or later-developed distributed processing and/and storage network.

In the various exemplary embodiments outlines above, the temporary digital ink generating system 200 can be implemented using a programmed general purpose computer. However, the temporary digital ink generating system 200 can also be implemented using a special purpose computer, a programmed microprocessor or microcontroller and peripheral integrated circuit elements, and ASIC or other integrated circuit, a digital signal processor, a hardware electronic or logic circuit, such as a discrete element circuit, a programmable logic device, such as PLD, PLA, FPGA or PAL, or the like. In general, any device, capable of implementing a finite state machine that is in turn capable of implementing the flow chart shown in FIG. 5, can be used to implement the temporary digital ink generating system 200.

Each of the circuits and element of the various exemplary embodiments of the temporary digital ink generating system 200 outlines above can be implemented as portions of a suitable programmed general purpose computer. Alternatively, each of the circuits and elements of the various exemplary embodiments of the temporary digital ink generating system 200 outlined above can be implemented as physically distinct hardware circuits within an ASIC, or using FPGA, a PDL, a PLA or a PAL, or using discrete logic elements or discrete circuit elements. The particular form each of the circuits and elements of the various exemplary embodiments of the temporary digital ink generating system 200 outlined above will take is a design choice and will be obvious and predicable to those skilled in the art.

Moreover, the various exemplary embodiments of the temporary digital ink generating system 200 outlined above and/or each of the various circuits and elements discussed above can each be implemented as software routines, managers or objects executing on a programmed general purposed computer, a special purpose computer, a microprocessor or the like. In this case, the various exemplary embodiments of the temporary digital ink generating system 200 and/or each of the various circuits and elements discussed above can each be implemented as one or more routines embedded in the communication network, as a resource residing on a server, or the like. The various exemplary embodiments of the temporary digital ink generating system 200 and the various circuits and elements discussed above can also be implemented by physically incorporating the temporary digital ink generating system 200 into a software and/or hardware system, such as the hardware and software system of a web server or a client device.

This invention is not limited to the above described methods and apparatus. One of ordinary skill in the art would understand that many different modifications are possible without departing from the scope of the invention.

Additionally, those skilled in the art will recognize many applications for the present invention, including but not limited to display devices such as file browser devices, systems that display applications of a personal computer, handheld devices, and the like. In short, the invention has application to any known or later developed system or device capable of using digital ink.

What is claimed is:

1. A method for generating and displaying temporary digital ink on a displayed media, comprising,
    selecting at least one displayed digital ink to fade;
    applying the at least one displayed digital ink on the displayed media; and
    fading at least one of the selected at least one displayed digital ink based on at least a first condition,
    wherein the first condition is a predetermined time, the predetermined time being based on:
    appearance of the first stroke of the digital ink to users who did not apply the digital ink, appearance of a completed digital ink to the users who did not apply the digital ink, application of a first stroke of succeeding digital ink, completion of a succeeding digital ink, or an intonational phrase.

2. The method according to claim 1, wherein the media is a collaboratively shared media.

3. The method according to claim 1, wherein selecting displayed digital inks to fade is based on at least a second condition.

4. The method according to claim 3, wherein the second condition is user specification, time, importance of marks, user identification, or percentage of display area marked.

5. The method according to claim 1, wherein the displayed digital ink is a referent gesture.

6. The method according to claim 1, wherein the intonational phrase is based on an intonational phrase accompanying the digital ink.

7. The method according to claim 1, wherein the first condition further comprising a command from the user.

8. The method according to claim 1, wherein the first condition further comprises one of an audio input and a video input.

9. The method according to claim 8, wherein the audio input is one of a) start or end of audio detection and b) an identification of the audio input.

10. The method according to claim 8, wherein the video input is one of a) start or end of video detection and b) an identification of the video input.

11. The method according to claim 8, wherein the audio input is an intonational phrase.

12. The method according to claim 1, wherein the digital ink fades at predetermined speed.

13. The method according to claim 12, wherein the predetermined speed is based on a user identification.

14. The method according to claim 12, wherein the predetermined speed depends on an importance determination of a word in the media marked by the digital ink.

15. The method according to claim 1, wherein the digital ink fades completely.

16. The method according to claim 1, wherein the digital ink partially fades at a completion of the fading.

17. The method according to claim 1, further comprising, switching the at least one of the selected at least one digital ink to a non-fading digital ink.

18. The method according to claim 17, further comprising, switching the non-fading digital ink to a fading digital ink.

19. The method according to claim 1, further comprising, changing display attributes, in addition to the fading, of the at least one of the selected at least one digital ink based on the first condition.

20. The method according to claim 19, wherein the display attributes include a color, thickness or shape of the selected digital inks.

21. The method according to claim 1, further comprising, selecting a faded or fading digital ink; and
    recovering the selected faded or fading digital ink.

22. The method according to claim 21, further comprising, making the recovered digital ink permanent on the document.

23. A system for generating and displaying temporary digital ink on a displayed media comprising,
    a temporary digital ink generating circuit that applies at least one displayed digital ink on the displayed media;
    a controller for selecting the at least one displayed digital ink to be faded; and
    a digital ink fading circuit that fades at least one of the selected at least one displayed digital ink based on at least a first condition,
    wherein the first condition is a predetermined time, the predetermined time being based on:
    appearance of the first stroke of the digital ink to users who did not apply the digital ink, the appearance of a completed digital ink to the users who did not apply the digital ink, application of a first stroke of succeeding digital ink, completion of a succeeding digital ink, or an intonational phrase.

24. The method according to claim 23, wherein the media is a collaboratively shared media.

25. The system according to claim 23, wherein the intonational phrase is based on an intonational phrase accompanying the digital ink.

26. The system according to claim 23, wherein the digital ink is a referent gesture.

27. The system according to claim 23, wherein the first condition further comprises a command from the user.

28. The system according to claim 23, wherein the first condition further comprises one of an audio input and a video input.

29. The system according to claim 28, wherein the audio input is one of a) start or end of audio detection and b) an identification of the audio input.

30. The system according to claim 28, wherein the video input is one of a) start or end of video detection and b) an identification of the video input.

31. The system according to claim 28, wherein the audio input is an intonational phrase.

32. The system according to claim 23, wherein the digital ink fades at a predetermined speed.

33. The system according to claim 32, wherein the predetermined speed is based on a user identification.

34. The system according to claim 32, wherein the predetermined speed depends on an importance determination of a word in the media marked by the digital ink.

35. The system according to claim 23, wherein the digital ink fades completely.

36. The system according to claim 23, wherein the digital ink partially fades at a completion of the fading.

37. The system according to claim 36, further comprising,
a digital ink switching system that switches the digital ink that is fading to a non-fading digital ink or the non-fading digital ink to a fading digital ink.

38. The system according to claim 23, further comprising,
a digital ink controlling system changes display attribute, in addition to the fading, of the at least one of the selected at least one digital ink based on the first condition.

39. The system according to claim 38, wherein the display attribute include color, thickness or shape of the digital inks.

40. The system according to claim 23, further comprising:
a digital ink recovery system that recovers the fading or faded digital ink.

41. The system according to claim 40, wherein the digital ink recovery system makes the recovered fading digital ink a non-fading digital ink.

42. A computer readable storage medium, comprising, computer readable program code embodied on the computer readable storage medium, the computer readable program code usable to program a computer to perform a method for generating and displaying temporary digital ink on displayed media, comprising,
selecting at least one displayed digital ink to fade; and
applying the at least one displayed digital ink on the displayed media; and
fading at least one of the selected at least one displayed digital ink based on at least a first condition,
wherein the first condition is a predetermined time, the predetermined time being based on:
appearance of the first stroke of the digital ink to users who did not apply the digital ink, the appearance of the completed digital ink to the users who did not apply the digital ink, application of a first stroke of succeeding digital ink, completion of a succeeding digital ink, and an intonational phrase.

43. The method according to claim 42, wherein the media is a collaboratively shared media.

44. The computer readable storage medium according to claim 42, wherein selecting digital inks to fade is based on at least a second condition.

45. The computer readable storage medium according to claim 44, wherein the second condition is user specification, time, importance of marks, user identification, or percentage of display area marked.

46. The method according to claim 42, wherein the digital ink is a referent gesture.

47. The computer readable storage medium according to claim 42, wherein the intonational phrase is based on an intonational phrase accompanying the digital ink.

48. The computer readable storage medium according to claim 42, wherein the first condition further comprises a command from the user.

49. The computer readable storage medium according to claim 42, wherein the first condition further comprises one of an audio input and a video input.

50. The method according to claim 49, wherein the audio input is one of a) start or end of audio detection and b) an identification of the audio input.

51. The method according to claim 49, wherein the video input is one of a) start or end of video detection and b) an identification of the video input.

52. The method according to claim 49, wherein the audio input is an intonational phrase.

53. The computer readable storage medium according to claim 42, wherein fading the digital inlc is at predetermined speed.

54. The computer readable storage medium according to claim 53, wherein the predetermined speed is based on a user identification.

55. The computer readable storage medium according to claim 53, wherein the predetermined speed depends on an importance determination of a word in the media marked by the digital ink.

56. The computer readable storage medium according to claim 42, wherein the digital ink fades completely.

57. The computer readable storage medium according to claim 42, wherein the digital ink partially fades at a completion of the fading.

58. The computer readable storage medium according to claim 42, further comprising,
switching the at least one the selected at least one digital ink to a non-fading digital ink.

59. The computer readable storage medium according to claim 58, further comprising,
switching the non-fading digital ink to a fading digital ink.

60. The computer readable storage medium according to claim 59, further comprising,
changing display attributes, in addition to the fading of the at least one of the selected at least one digital ink based on the first condition.

61. The computer readable storage medium according to claim 60, wherein the display attributes include a color, thickness or shape of the selected digital inks.

62. The computer readable storage medium according to claim 42, further comprising,
selecting a faded or fading digital ink; and
recovering the selected faded or fading digital ink.

63. The computer readable storage medium according to claim 62, further comprising,
making the recovered digital ink permanent on the document.

64. A method for generating and displaying temporary digital ink on a displayed media, comprising,
providing a collaboratively shared displayed media;
selecting at least one displayed digital ink to fade;
applying a plurality of displayed digital inks on the collaboratively shared displayed media; and
fading at least one of the selected at least one displayed digital ink based on at least one condition, wherein fading the digital ink is at a predetermined speed, the predetermined speed depending on an importance determination of a word in the media marked by the digital ink.

65. A method for generatihg and displaying temporary digital ink on a displayed media, comprising,
selecting at least one displayed digital ink to fade;
applying the at least one displayed digital ink on the displayed media;
fading at least one of the selected at least one displayed digital ink based on at least a first condition;
selecting a faded or fading digital ink; and
recovering the selected faded or fading digital ink.

66. The method according to claim 65, wherein the selected faded or fading digital ink is recovered to a fadeable state.

67. A system for generating and displaying temporary digital ink on a displayed media comprising,
- a temporary digital ink generating circuit that applies at least one displayed digital ink on the displayed media;
- a controller for selecting the at least one displayed digital ink to be faded;
- a digital ink fading circuit that fades at least one of the selected at least one displayed digital ink based on at least a first condition;
- a controller for selecting fading or faded digital ink for recovery; and
- a digital ink recovery system that recovers the selected fading or faded digital ink.

68. A computer readable program code embodied on the computer readable storage medium, the computer readable program code used to program a computer to perform a method for generating and displaying temporary digital ink on a displayed media, comprising,
- selecting at least one displayed digital ink to fade;
- applying the at least one displayed digital ink on a media;
- fading at least one of the selected at least one displayed digital ink based on at least a first condition;
- selecting a faded or fading digital ink; and
- recovering the selected faded or fading digital ink.

* * * * *